United States Patent
Tao et al.

(10) Patent No.: US 11,368,064 B2
(45) Date of Patent: Jun. 21, 2022

(54) OUTER ROTOR DIRECT DRIVE MOTOR WITH POSITION ENCODER

(71) Applicant: SEMIMENT TECHNOLOGIES (SHANGHAI) CO., LTD., Shanghai (CN)

(72) Inventors: Cheng Tao, Shanghai (CN); Ying Yang, Shanghai (CN); Honggang Song, Shanghai (CN)

(73) Assignee: SEMIMENT TECHNOLOGIES (SHANGHAI) CO., LTD., Shanghai (CN)

( * ) Notice: Subject to any disclaimer, the term of this patent is extended or adjusted under 35 U.S.C. 154(b) by 40 days.

(21) Appl. No.: 16/960,549

(22) PCT Filed: Mar. 19, 2020

(86) PCT No.: PCT/CN2020/080245
§ 371 (c)(1),
(2) Date: Jul. 8, 2020

(87) PCT Pub. No.: WO2020/114527
PCT Pub. Date: Jun. 11, 2020

(65) Prior Publication Data
US 2021/0159748 A1    May 27, 2021

(30) Foreign Application Priority Data
Nov. 27, 2019  (CN) .......................... 201911183612.8

(51) Int. Cl.
*H02K 1/2786*    (2022.01)
*H02K 1/16*    (2006.01)
(Continued)

(52) U.S. Cl.
CPC ............. *H02K 1/2786* (2013.01); *H02K 1/16* (2013.01); *H02K 5/1732* (2013.01); *H02K 17/44* (2013.01); *H02K 2203/03* (2013.01)

(58) Field of Classification Search
CPC ...... H02K 1/2786; H02K 1/16; H02K 5/1732; H02K 17/44; H02K 2203/03; H02K 11/225; H02K 2205/03; H02K 11/21
See application file for complete search history.

(56) References Cited

U.S. PATENT DOCUMENTS 5,604,412 A * 2/1997 Okada ..................... H02K 1/187
                                                           318/400.26
6,356,005 B1 * 3/2002 Hsu ........................ H02K 1/146
                                                            310/254.1
(Continued)

*Primary Examiner* — Tulsidas C Patel
*Assistant Examiner* — Riley O. Stout
(74) *Attorney, Agent, or Firm* — Bayramoglu Law Offices LLC

(57) ABSTRACT

An outer rotor direct drive motor with a position encoder includes an outer rotor and a stator disposed in the outer rotor, wherein the stator includes: a stator chassis; a stator printed circuit board disposed on an side of the stator chassis, at least an excitation coil and a receiving coil being printed at the stator printed circuit board; and a stator winding disposed on the stator printed circuit board; wherein the outer rotor changes a coupling strength between the excitation coil and the receiving coil. The present invention has the following advantages: the installation method is flexible, and supports through-shaft installation without occupying too much space of the motor body; the sensor structure is stable, the rotor scale area and the induction coil are all printed on the printed circuit board, even in the case where the rotational speed is too fast, deformation or cracking will not be occurred.

8 Claims, 11 Drawing Sheets

(51) Int. Cl.
  *H02K 5/173* (2006.01)
  *H02K 17/44* (2006.01)

(56) References Cited

U.S. PATENT DOCUMENTS

| 6,522,128 | B1* | 2/2003 | Ely | G01B 7/30 |
| | | | | 324/207.17 |
| 2018/0236991 | A1* | 8/2018 | Tada | B60T 13/741 |
| 2019/0128704 | A1* | 5/2019 | Tada | G01D 5/2073 |
| 2020/0235636 | A1* | 7/2020 | Miyazawa | H02K 11/215 |

* cited by examiner

--Prior Art--

--Prior Art--

FIG. 3 --Prior Art--

--Prior Art--

--Prior Art--

OUTER ROTOR DIRECT DRIVE MOTOR WITH POSITION ENCODER

CROSS REFERENCE TO THE RELATED APPLICATIONS

This application is the national phase entry of International Application No. PCT/CN2020/080245, filed on Mar. 19, 2020, which is based upon and claims priority to Chinese Patent Application No. 201911183612.8, filed on Nov. 27, 2019, the entire contents of which are incorporated herein by reference.

TECHNICAL FIELD

The present invention relates to an outer rotor direct drive motor with a position encoder.

BACKGROUND

It can be commonly seen in our daily life that some motors directly drive pulleys to work without using reducers to connect working machines and the motors. When these motors drive loads, they need to be driven through transmission devices (such as transmission belts, etc.). Then, there is actually a motor that can save the transmission device and directly drive loads. The motor is a direct drive motor that uses "direct drive technology". As we all know, the transmission mechanism of the conventional motor is that the motor mover is connected to the load through the motor shaft and then through a series of mechanical transmission mechanisms such as couplings, screw rods, timing belts, racks, reducers, etc. In the process, from the mechanical point of view, the possibility of the existence of factors such as clearance, elastic deformation, friction damping, etc. has been increased, resulting in the reduction and loss of equipment rigidity and response characteristics.

Unlike the conventional motor, the direct drive motor directly couples the moving load and the motor mover together, thereby saving the connection mechanisms such as reducers, gear boxes, pulleys, etc., so that the entire system has the advantages of high efficiency, low consumption, high speed, high reliability, maintenance-free, high rigidity, fast response, no need for lubrication, quiet operation, etc.

At the same time, because the direct drive motor has a large output torque, it is also called a torque motor. In order to maximize the output torque, however, a design method of an outer rotor direct drive motor is generally adopted. The outer rotor motor means that the rotor is an outer permanent magnet pole and an inner coil part is fixed; and an inner rotor motor means that the rotor is an inner coil part and an outer permanent magnet pole is fixed. Under the same motor size, the output torque of the outer rotor motor is much larger than that of the inner rotor motor. Therefore, in order to maximize the output torque, many designers generally adopt the design method of the outer rotor direct drive motor.

However, in terms of position encoder selection as the most important part of the motor control system, there are many technical barriers to the outer rotor direct drive motor.

1) At present, many servo motor encoders use magnetic effect encoders or photoelectric encoders, wherein the magnetic effect encoder needs to be installed on a motor shaft end, a motor shaft of the outer rotor direct drive motor is connected to a motor housing at one end and directly connected to a moving load at the other end, and there is no space left for the installation of the magnetic effect encoder. Due to the harsh working environment, such as vibration, oil pollution, etc., the photoelectric encoder will be damaged. Also, the price is expensive. Therefore, the photoelectric encoder is also not the first choice for designers of the outer rotor direct drive motors.

2) The position encoders used in many outer rotor direct drive motors on the current market are simple three Hall switches, the most basic function of which is to collect position signals for three-phase current switching of the motor. However, the resolution of the position encoder is limited to the number of motor pole pairs. For example, the number of motor pole pairs is 1, and then the motor can only obtain 6 position signals for one revolution. The resolution is much lower than an ordinary servo motor. Thus, it can not accurately reflect the position information of the motor rotation so that the control system cannot effectively control the parameters such as motor efficiency, speed, output torque, etc., which causes energy waste.

SUMMARY

In view of the defects in the prior art, an objective of the present invention is to provide an outer rotor direct drive motor with a position encoder that solves the above technical problems.

To solve the above technical problems, the present invention provides an outer rotor direct drive motor with a position encoder, comprising an outer rotor and a stator disposed in the outer rotor, wherein the stator includes: a stator chassis; a stator printed circuit board disposed on a side of the stator chassis, at least an excitation coil and a receiving coil being printed at the stator printed circuit board; and a stator winding disposed on the stator printed circuit board; wherein the outer rotor changes a coupling strength between the excitation coil and the receiving coil.

Preferably, the outer rotor includes: a motor housing; a motor shaft, an end of the motor shaft extending into the motor housing and being connected to a bottom of the motor housing; permanent magnet steels disposed on an inner side wall of the motor housing; and an induction mechanism disposed on the motor housing, the induction mechanism corresponding to the excitation coil and the receiving coil; wherein the induction mechanism changes the coupling strength between the excitation coil and the receiving coil.

Preferably, the induction mechanism includes a rotor printed circuit board disposed on the motor housing, and a plurality of conductive material scale areas periodically repeated in a circumferential direction are printed on the rotor printed circuit board.

Preferably, the conductive material scale areas printed on the rotor printed circuit board are overlapped with the excitation coil and the receiving coil printed on the stator printed circuit board in a vertical direction.

Preferably, the induction mechanism includes sawtooth structures periodically repeated and disposed at a bottom of a side wall of the motor housing.

Preferably, the sawtooth structures at the bottom of the side wall of the motor housing are overlapped with the excitation coil and the receiving coil printed on the stator printed circuit board in a vertical direction.

Preferably, the permanent magnet steels are polarities alternately and evenly distributed along an inner wall of the motor housing.

Preferably, the number of pole pairs of the permanent magnet steels is a positive integer greater than or equal to 1.

Preferably, a rotor bearing is provided on the motor shaft, and a stator bearing is provided on the stator chassis.

Preferably, a spring is provided between the outer rotor and the stator.

Compared with the prior art, the present invention differs from the conventional outer rotor direct drive motor in that it uses an electromagnetic induction position encoder. Compared with the Hall switch, the magnetic effect encoder and the photoelectric encoder, the electromagnetic induction position encoder has the following advantages.

a) The installation method is flexible, and it supports through-shaft installation without occupying too much space of the motor body.

b) The sensor structure is stable. The rotor scale area and the induction coil are all printed on the printed circuit board. Even in the case where the rotational speed is too fast, deformation or cracking will not be occurred. At the same time, its non-contact induction method is not affected by external environments such as oil pollution and electromagnetic interference.

c) The accuracy is high and the resolution is high. The receiving coil has one or more periodically repeated specific geometric figure structure characteristics. The more the number of repetition cycles, the more the number of signals obtained, and the higher the resolution of the output signal. It can not only speed up the circuit processing speed, but also improve the accuracy of the encoded signal. Unlike the conventional motors that increase the number of motor pole pairs to improve the resolution, in the embodiment, increasing the number of cycles of the receiving coil only requires drawing more receiving coils on the stator printed circuit board without adding additional cost.

d) The resolution of signal of the motor encoder is increased without adding additional cost or changing the motor structure.

BRIEF DESCRIPTION OF THE DRAWINGS

Other features, objectives, and advantages of the present invention will become more apparent by reading a detailed description of non-limiting embodiments made with reference to the following drawings.

DETAILED DESCRIPTION OF THE EMBODIMENTS

The present invention will be described in detail below in conjunction with specific embodiments. The following embodiments will help those skilled in the art to further understand the present invention, but do not limit the present invention in any form. It should be noted that, those ordinary skilled in the art can make several changes and improvements without departing from the spirit of the present invention.

Figure 1:
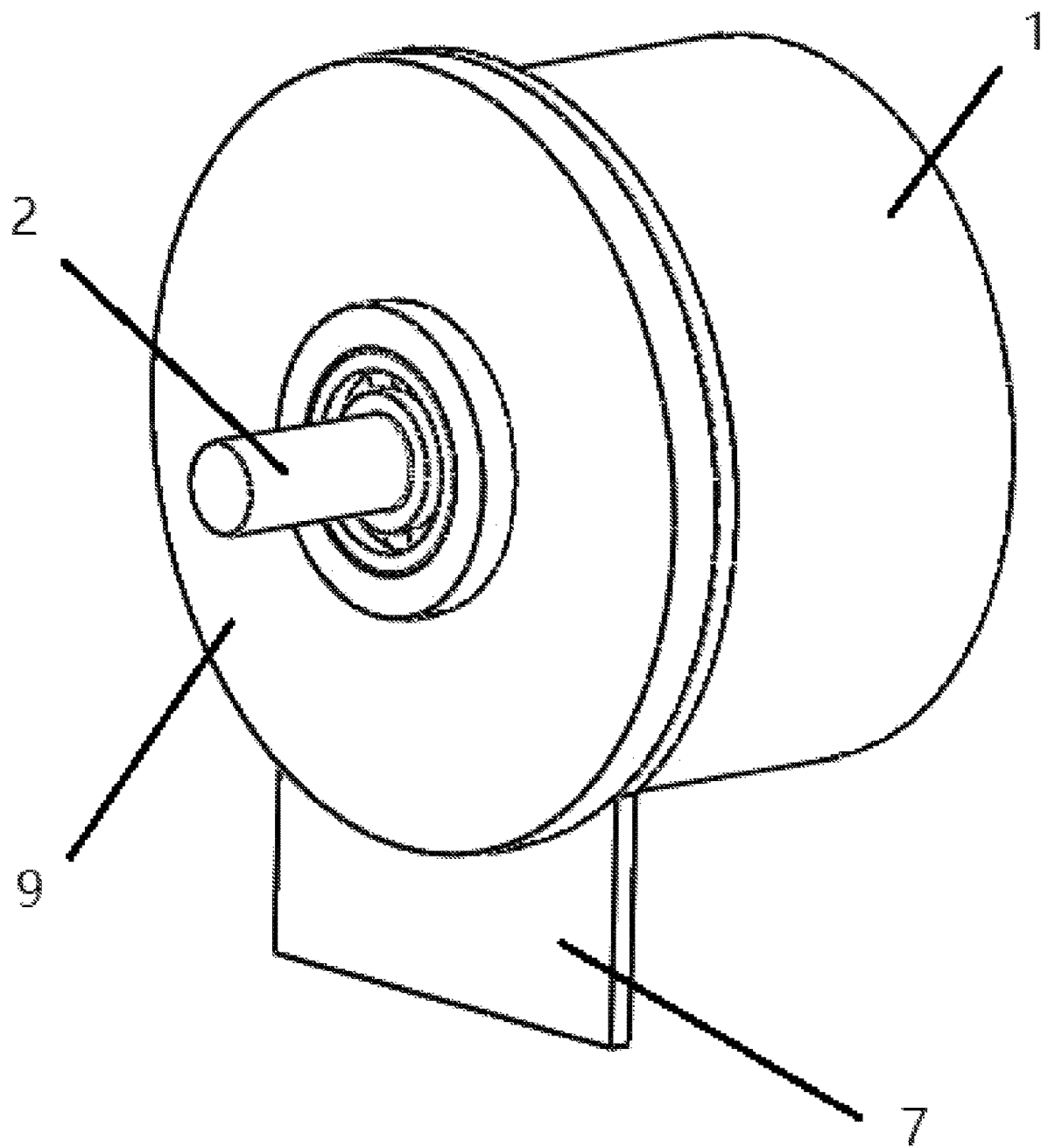
FIG. 1 is a schematic view of an appearance of an outer rotor direct drive motor.

FIG. 1 is a schematic view of an appearance of an outer rotor direct drive motor.

Figure 2:
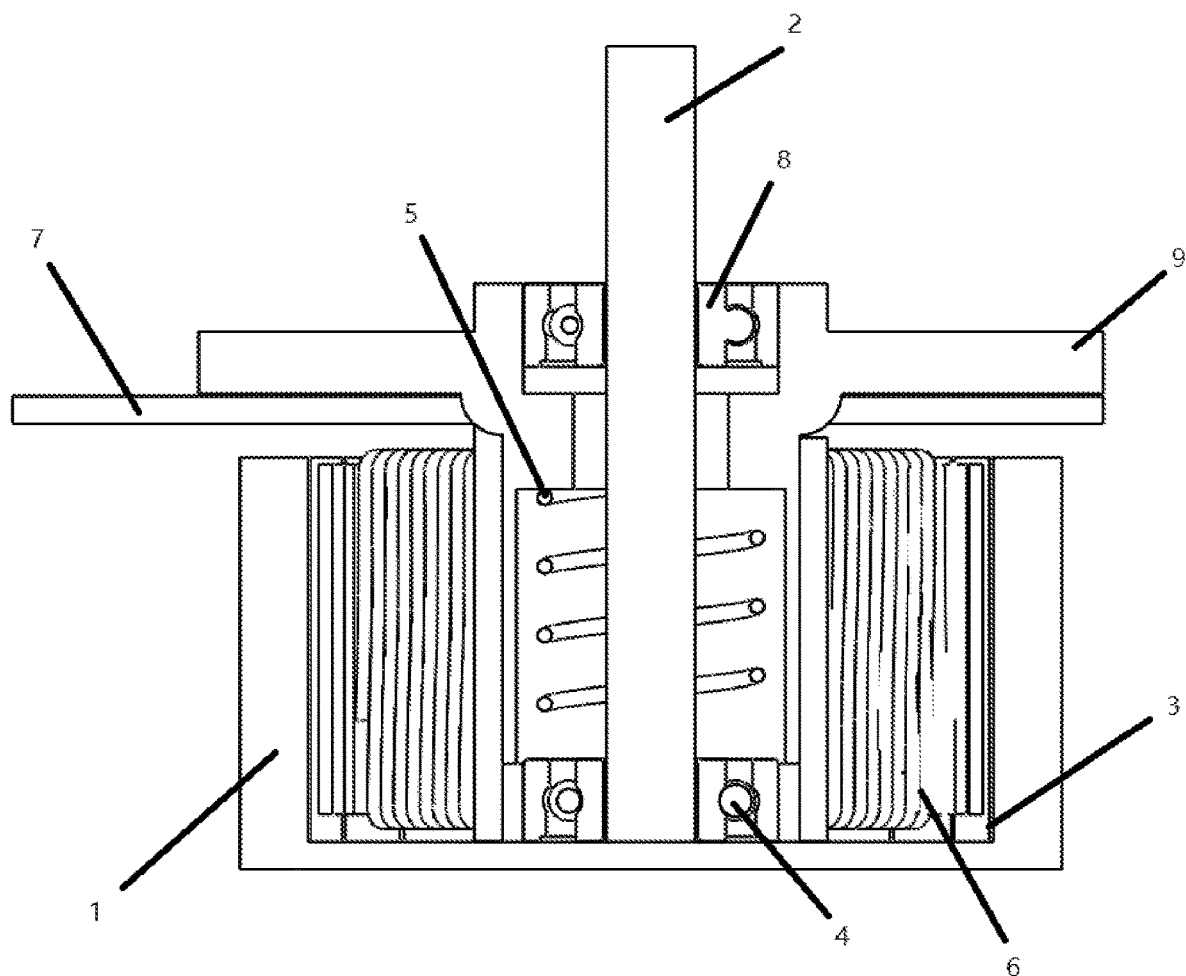
FIG. 2 is a cross-sectional view of an appearance of a conventional outer rotor direct drive motor.

FIG. 2 is a cross-sectional view of an appearance of a conventional outer rotor direct drive motor.

Figure 3:
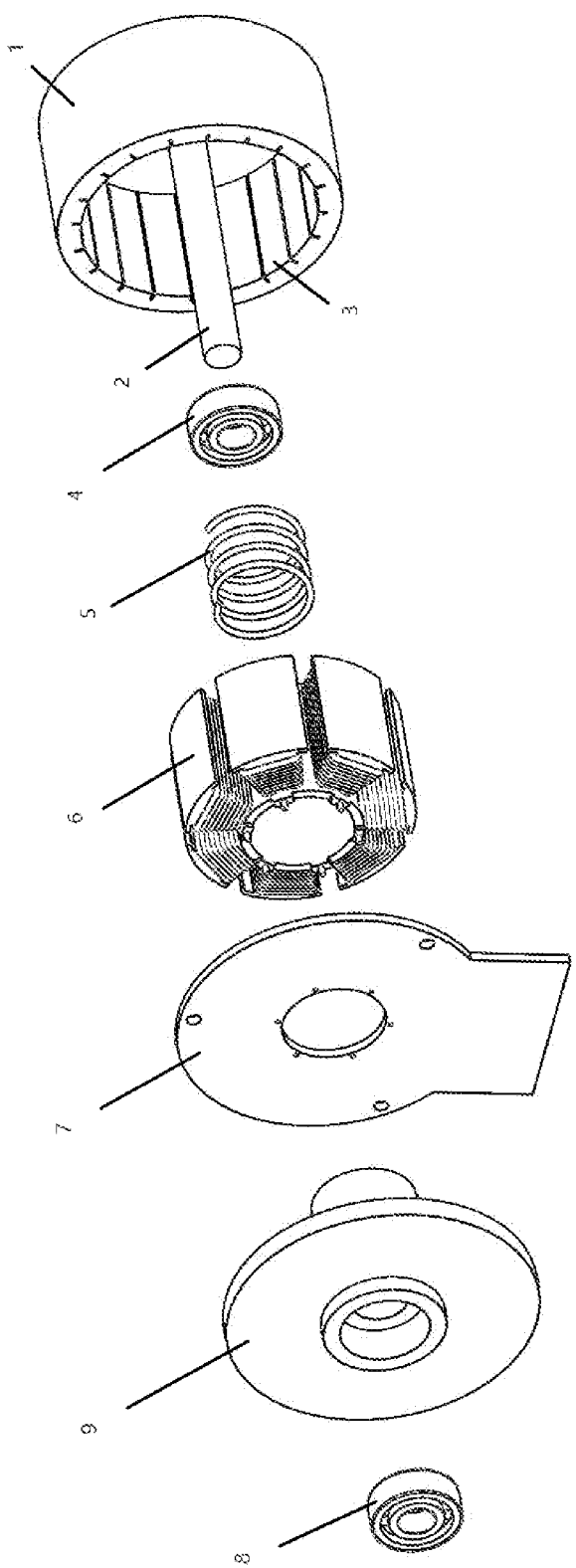
FIG. 3 is a schematic view of an exploded structure of a conventional outer rotor direct drive motor.

FIG. 3 is a schematic view of an exploded structure of a conventional outer rotor direct drive motor.

As shown in FIGS. 1, 2 and 3, the conventional outer rotor direct drive motor is composed of an outer rotor and a stator. The outer rotor is installed outside the stator. The outer rotor includes the motor housing 1, the motor shaft 2, the permanent magnetic steels 3 and the rotor bearing 4. The motor housing 1 forms a storage space and wraps the stator winding 6 therein, and an end of the motor shaft 2 is directly connected to the motor housing 1. At the same time, the permanent magnetic steels 3 are installed on a side surface of an inner wall of the motor housing 1 (or embedded in an inner wall of the motor housing). The rotor bearing 4 is installed on the motor shaft 2 to reduce the friction of the shaft 2 during rotation. The stator includes the stator winding 6, the stator printed circuit board 7, the stator bearing 8 and the stator chassis 9, wherein the stator winding 6 is installed on the stator printed circuit board 7, the stator printed circuit board 7 is installed on the stator chassis 9, and the stator bearing 8 is installed on the stator chassis 9 to reduce the friction of the shaft 2 during rotation either. The spring 5 is installed between the outer rotor and the stator, and when the two are squeezed by an external force, the spring 5 will play a function of buffering and restoring deformation.

Figure 4:
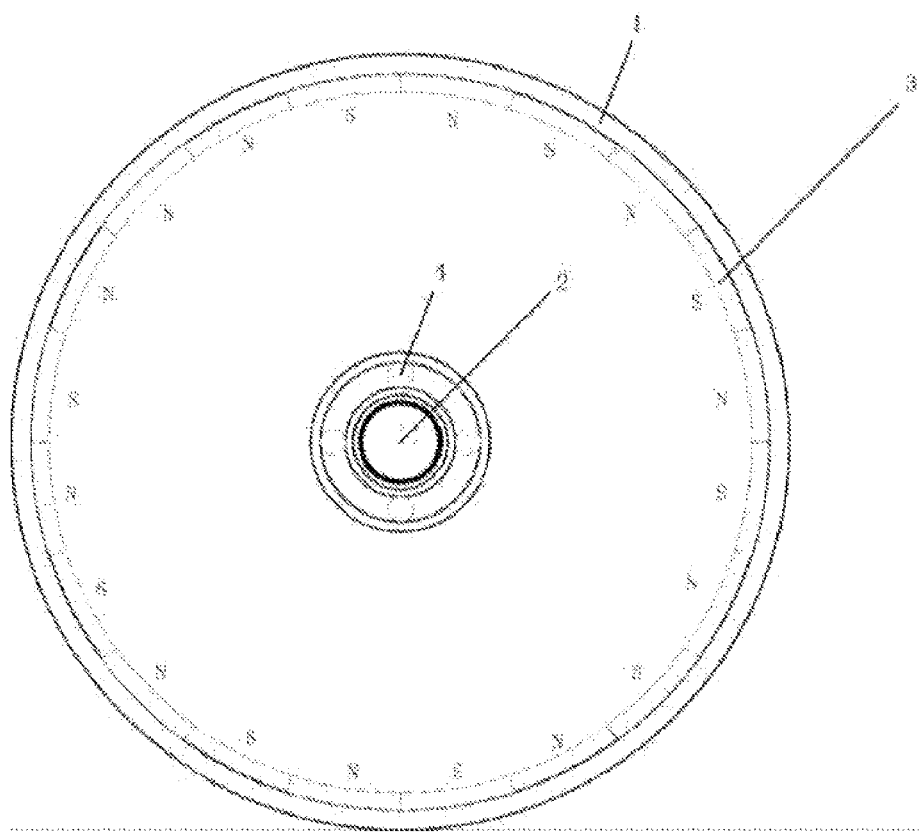
FIG. 4 is a schematic view of an outer rotor of a conventional outer rotor direct drive motor.

FIG. 4 is a schematic view of the outer rotor of a conventional outer rotor direct drive motor.

As shown in FIG. 4, the outer rotor is composed of the motor housing 1, the motor shaft 2, the permanent magnet steels 3 and the rotor bearing 4. The permanent magnet steels 3 are evenly distributed along the side surface of the inner wall of the motor housing 1 (or embedded in the inner wall of the motor housing), and the polarities are alternately distributed. The number of pole pairs of the permanent magnet steels is an integer greater than or equal to 1 (in the embodiment, the number of pole pairs is 10). An end of the motor shaft 2 is directly connected to the motor housing 1. The rotor bearing 4 is installed on the motor shaft 2 to reduce the friction of the shaft 2 during rotation.

Figure 5:
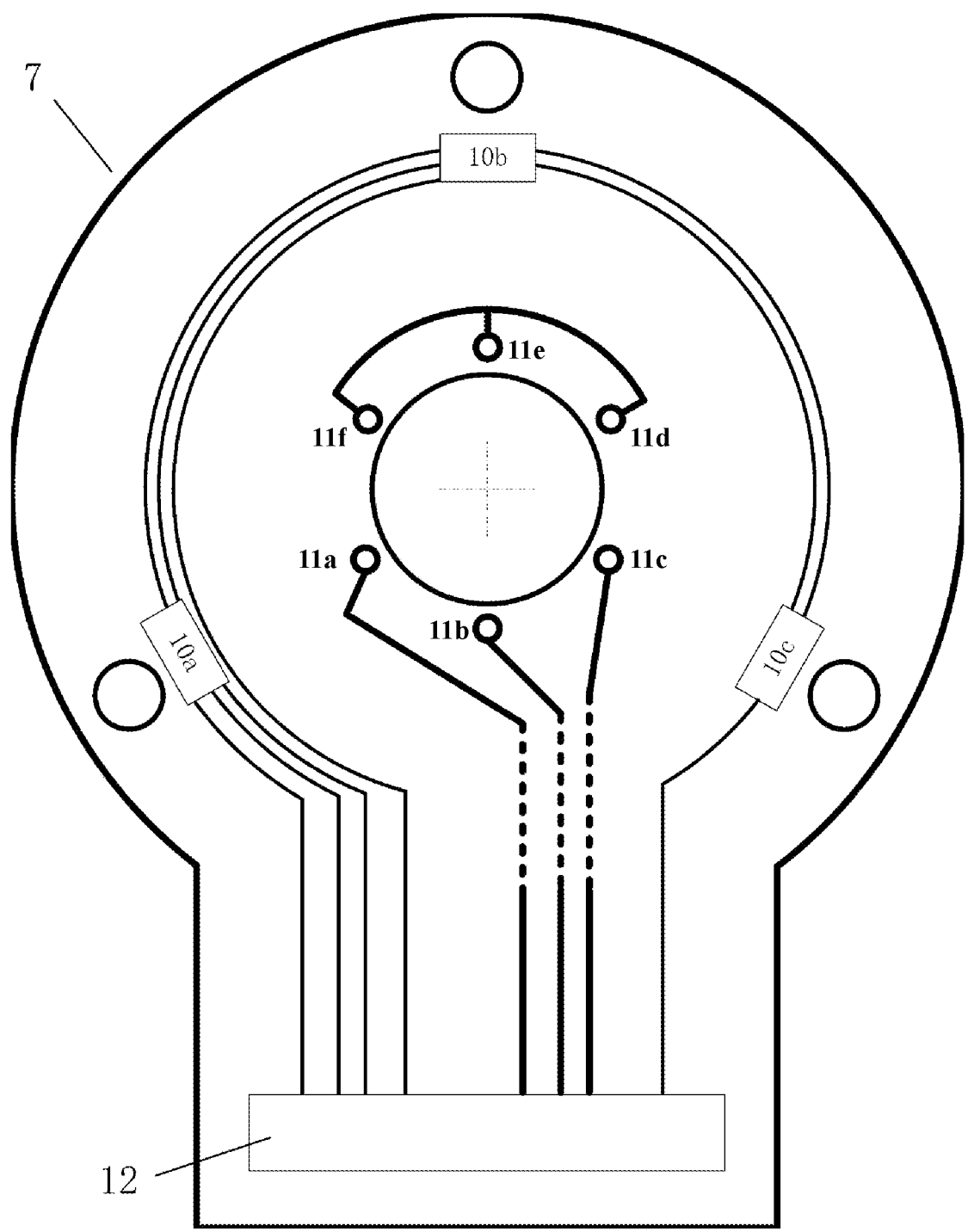
FIG. 5 is a schematic view of a stator printed circuit board of a conventional outer rotor direct drive motor.

FIG. 5 is a schematic view of the stator printed circuit board of a conventional outer rotor direct drive motor.

As shown in FIG. 5, three Hall switch chips (10a, 10b, and 10c) are provided on the stator printed circuit board 7 of the conventional outer rotor direct drive motor. The three Hall switch chips are each welded on the stator printed circuit board 7 with a phase difference of 120 degrees in a circumferential direction, and their power, ground and output signals are connected to the insert member 12 through the stator printed circuit board 7. At the same time, the three Hall switch chips (10a, 10b and 10c) and the permanent magnet steels 3 are on the same line in a vertical direction. Welding holes (11a, 11b, 11c, 11d, 11e, and 11f) are used to install the stator winding 6. The welding holes (11d, 11e, and 11f) as a common terminal of a three-phase current of the stator winding 6 are connected together on the stator printed circuit board 7, and the welding holes (11a, 11b, and 11c) as a lead-out terminal of the three-phase current of the stator winding 6 are connected to the insert member 12 through the stator printed circuit board 7. The insert member 12 is connected to a motor control system for outputting three-phase (U, V, W) position signals of the motor and controlling the switching of the three-phase current.

Based on the above structure of the conventional outer rotor direct drive motor, its working method is as follows.

After the system is powered, the three Hall switch chips (10a, 10b, and 10c) induce a magnetic field generated by the permanent magnet steels 3 directly above, generate U, V, and W switch signals, respectively, and transmit them to the motor control system to control the switching of the three-phase current and finally control the start and stop of the motor.

However, the outer rotor direct drive motor based on the above structure has the following problems.

1) The position encoders used in the outer rotor direct drive motor are simple three Hall switches, their most basic function is to collect position signals for three-phase current switching of the motor, and the resolution of the position encoder is limited to the number of motor pole pairs. For example, the number of motor pole pairs is 1, and then the motor can only obtain 6 position signals for one revolution. The resolution is much lower than an ordinary servo motor. Thus, it cannot accurately reflect the position information of the motor rotation so that the control system cannot effectively control the parameters such as motor efficiency, speed, output torque, etc., and causes energy waste. If the resolution is to be increased, the number of motor pole pairs needs to be increased, which will greatly increase the cost.

2) At present, many servo motor encoders use magnetic effect encoders or photoelectric encoders, wherein the magnetic effect encoder needs to be installed on a motor shaft end, a motor shaft of the outer rotor direct drive motor is connected to a motor housing at one end and directly connected to a moving load at the other end. Thus, there is no space left for the installation of the magnetic effect encoder. Due to the harsh working environment, such as vibration, oil pollution, etc., the photoelectric encoder will be damaged. Also, the price is expensive. Therefore, the photoelectric encoder is also not the first choice for designers of the outer rotor direct drive motors.

In order to solve the above problems, the present invention has made an improvement based on the structure of the outer rotor direct drive motor, and replaces the Hall switch with an electromagnetic induction position encoder.

Figure 6:
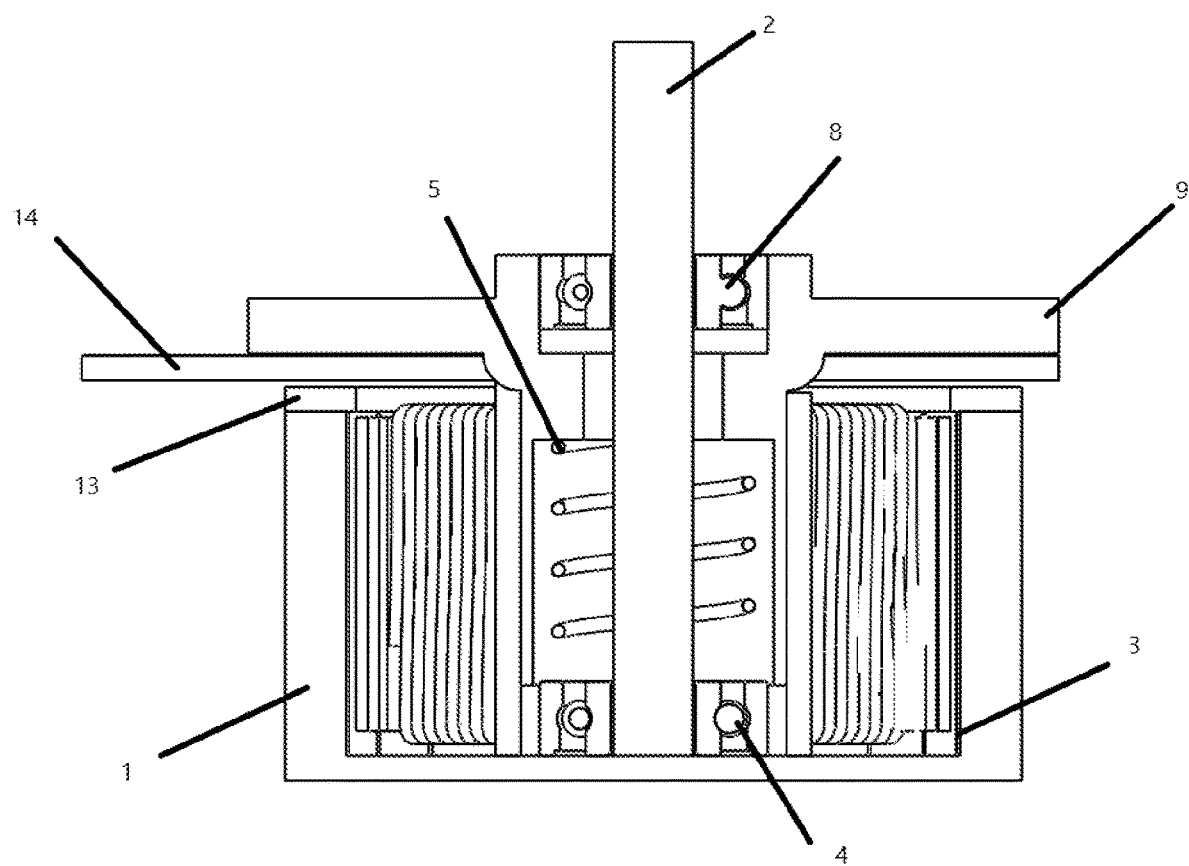
FIG. 6 is a cross-sectional view of Embodiment 1 of the present invention.

FIG. 6 is a cross-sectional view of Embodiment 1 of an outer rotor direct drive motor of the present invention.

Figure 7:
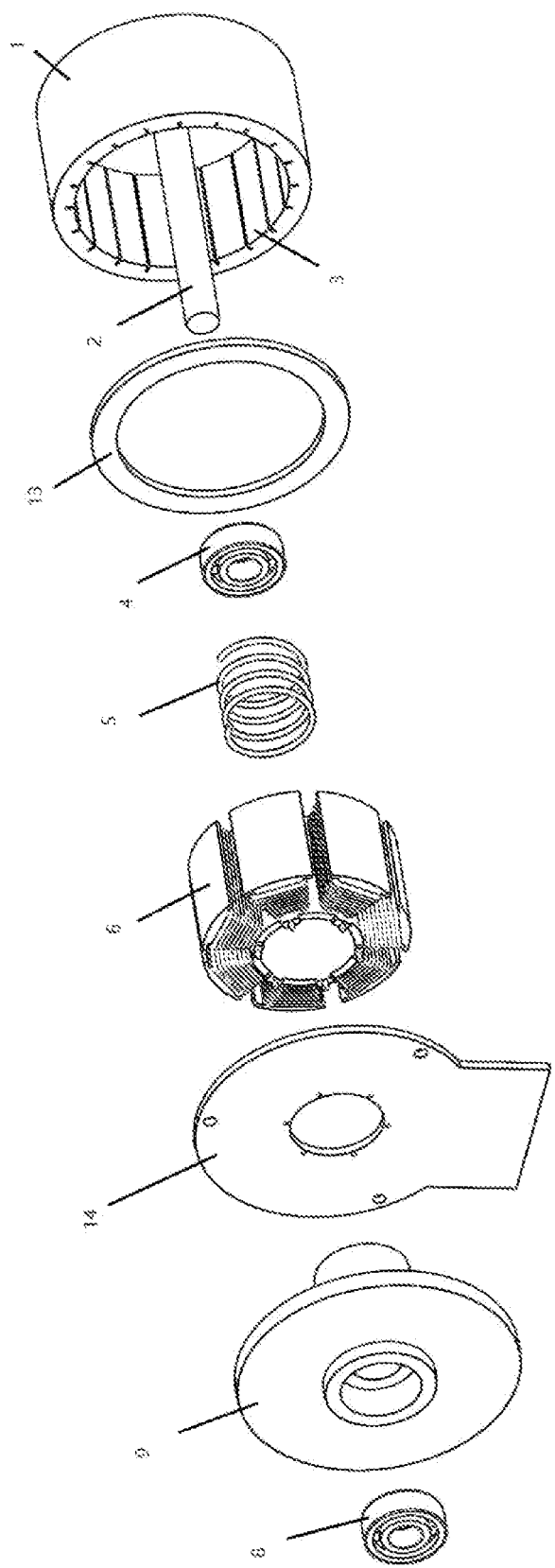
FIG. 7 is a schematic view of an exploded structure of Embodiment 1 of the present invention.

FIG. 7 is a schematic view of an exploded structure of Embodiment 1 of the outer rotor direct drive motor of the present invention.

As shown in FIGS. 6 and 7, Embodiment 1 of the outer rotor direct-drive motor of the present invention is composed of an outer rotor and a stator. The outer rotor is installed outside the stator. The outer rotor includes the motor housing 1, the motor shaft 2, the permanent magnetic steels 3, the rotor bearing 4 and the rotor printed circuit board 13, wherein the motor housing 1 forms a storage space and wraps the stator winding 6 therein, and an end of the motor shaft 2 is directly connected to the motor housing 1. At the same time, the permanent magnetic steels 3 are installed on a side surface of an inner wall of the motor housing 1 (or embedded in an inner wall of the motor housing). The rotor printed circuit board 13 is installed on the bottom of the side wall of the motor housing 1, the rotor bearing 4 is installed on the motor shaft 2 to reduce the friction of the shaft 2 during rotation. The stator includes the stator winding 6, the stator printed circuit board 14, the stator bearing 8 and the stator chassis 9, wherein the stator winding 6 is installed on the stator printed circuit board 14 (including at least the excitation coil 15 and the receiving coil 16). The stator printed circuit board 14 is installed on the stator chassis 9, the stator bearing 8 is installed on the stator chassis 9 to reduce the friction of the shaft 2 during rotation either. The spring 5 is installed between the outer rotor and the stator, and when the two are squeezed by an external force, the spring 5 will play a function of buffering and restoring deformation.

Figure 8:
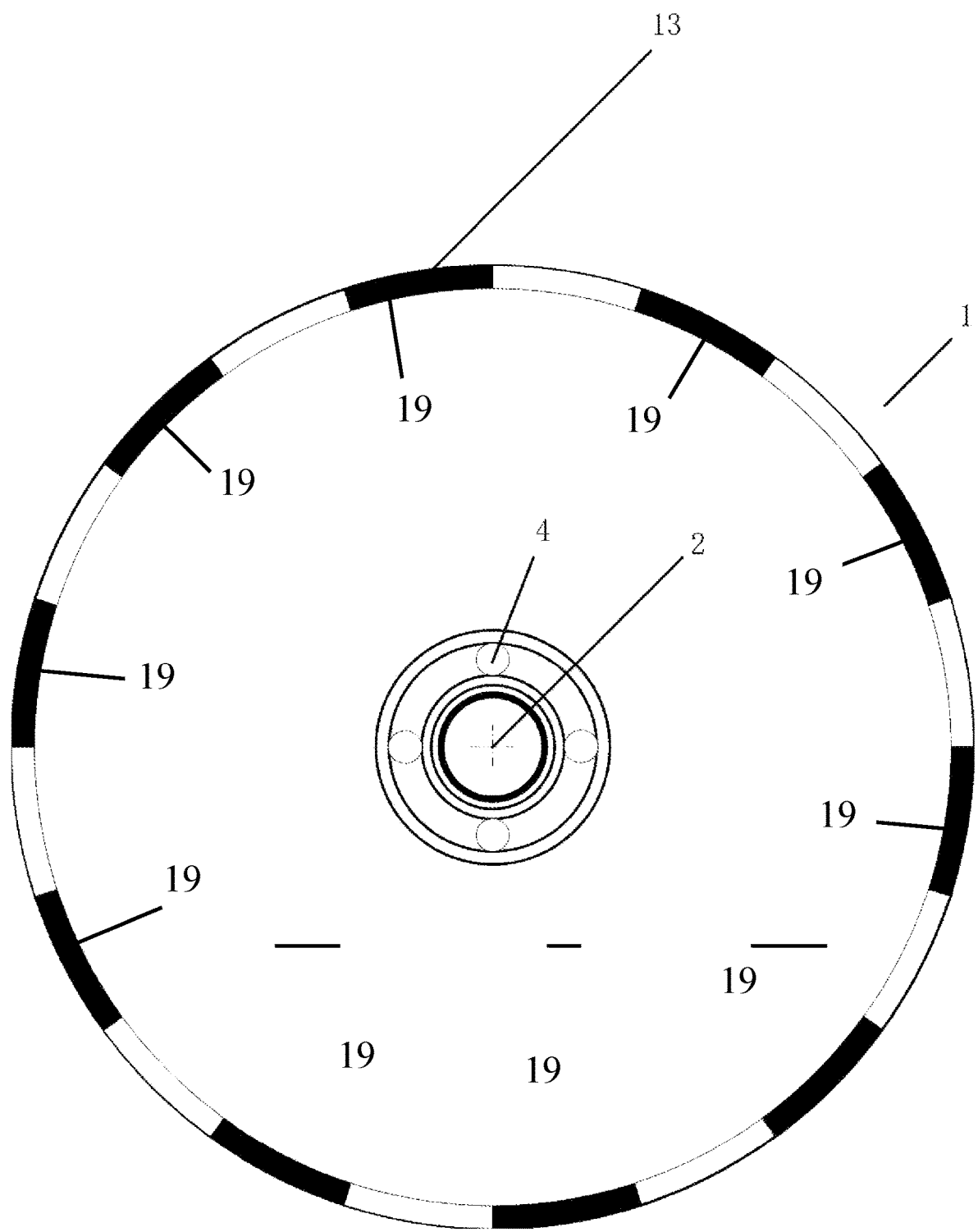
FIG. 8 is a schematic view of an outer motor of Embodiment 1 of the present invention.

FIG. 8 is a schematic view of the outer motor of Embodiment 1 of an outer rotor direct drive motor of the present invention.

As shown in FIG. 8, the outer rotor is composed of the motor housing 1, the motor shaft 2, the permanent magnet steels 3, the rotor bearing 4 and the rotor printed circuit board 13. The permanent magnet steels 3 are evenly distributed along the side surface of the inner wall of the motor housing 1 (or embedded in the inner wall of the motor housing), and the polarities are alternately distributed. The number of pole pairs of the permanent magnet steels is an integer greater than or equal to 1 (in the embodiment, the number of pole pairs is 10). An end of the motor shaft 2 is directly connected to the motor housing 1. The rotor bearing 4 is installed on the motor shaft 2 to reduce the friction of the shaft 2 during rotation. The rotor printed circuit board 13 is installed on the bottom of the side wall of the motor housing 1. At the same time, the rotor printed circuit board 13 is printed with a plurality of conductive material scale areas periodically repeated in a circumferential direction.

Figure 9:
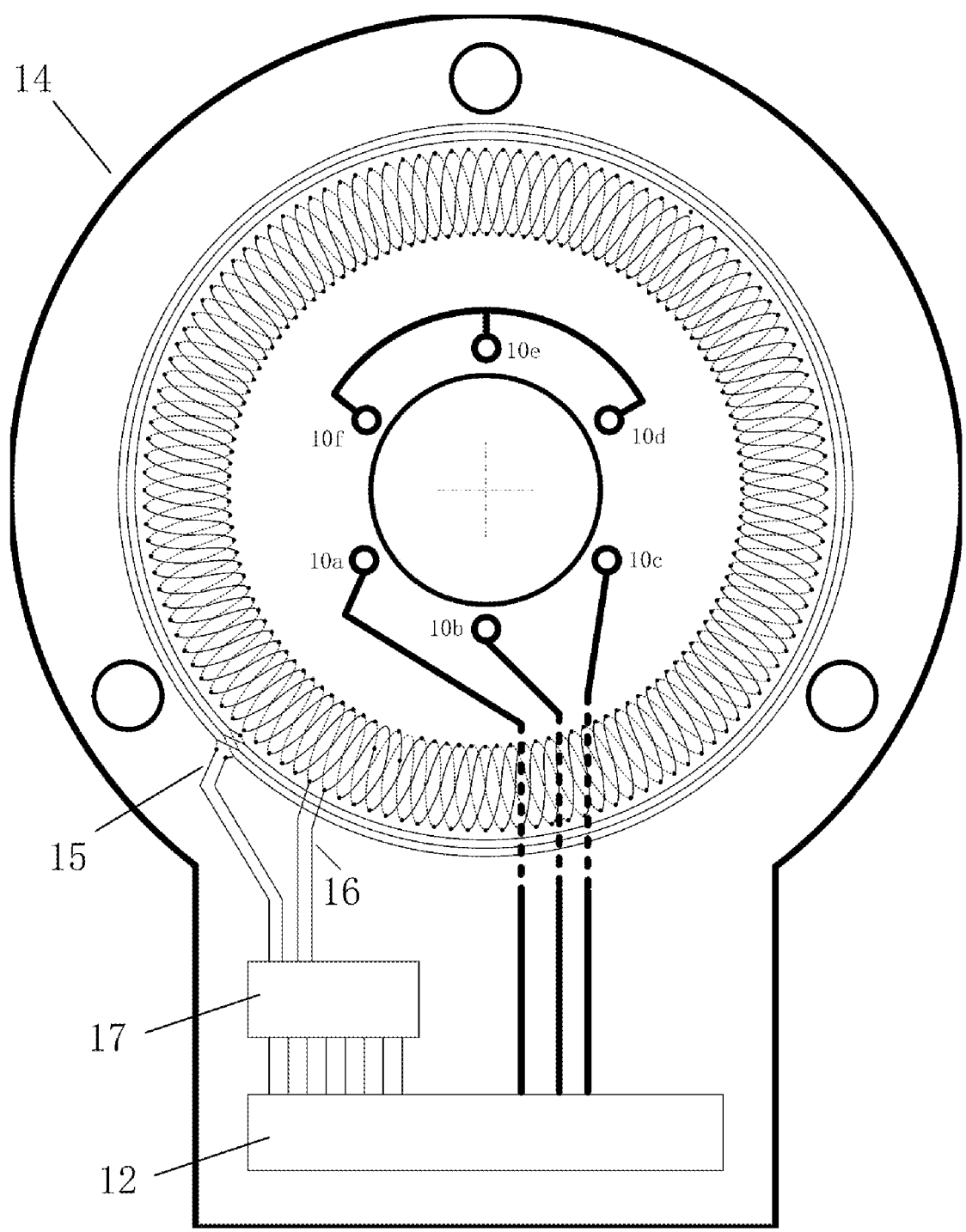
FIG. 9 is a schematic view of a stator printed circuit board of Embodiment 1 of the present invention.

FIG. 9 is a schematic view of the stator printed circuit board of Embodiment 1 of the outer rotor direct drive motor of the present invention.

As shown in FIG. 9, the stator printed circuit board 14 is printed with the excitation coil 15 and the receiving coil 16 along a circumferential direction connected to the processing chip 17 separately. Power, ground and output signals of the processing chip are connected onto the insert member 12 through the stator printed circuit board 14. At the same time, the excitation coil 15 and the receiving coil 16 are overlapped with the conductive material scale areas 19 on the rotor printed circuit board 13 in a vertical direction. Welding holes (11a, 11b, 11c, 11d, 11e, and 11f) are used to install the stator winding 6. The welding holes (11d, 11e, and 11f) as a common terminal of a three-phase current of the stator winding 6 are connected together on the stator printed circuit board 7, and the welding holes (11a, 11b, and 11c) as a lead-out terminal for the three-phase current of the stator winding 6 are connected to the insert member 12 through the stator printed circuit board 7. The insert member 12 is connected to a motor control system for outputting position encoding signals of the motor and controlling the switching of the three-phase current.

Based on the above structure of Embodiment 1 of the outer rotor direct drive motor of the present invention, its working method is as follows.

After the system is powered, the processing chip 17 cooperates with the excitation coil 15 to generate a high-frequency periodic AC voltage and current, and the alternating current flowing through the excitation coil will form an alternating electromagnetic field in its peripheral area.

According to Faraday's law of electromagnetic induction, the magnetic flux passing through a closed coil is changed, and an induced electromotive force will be generated on the closed coil. When the alternating electromagnetic field generated on the excitation coil passes through a closed receiving coil assembly, since the magnetic flux passing through the closed receiving coil assembly alternates, an alternating induced electromotive force with the same frequency is generated on each fan loop coil.

The conductive material scale areas 19 on the rotor printed circuit board 13 are used to affect the coupling relationship between the excitation coil 15 and the receiving coil 16. When the outer rotor is rotated, the motor housing 1 and the rotor printed circuit board 13 are driven to rotate together. The alternating electromagnetic field of the excitation coil 15 causes an eddy current field to be generated in the conductive material scale areas 19 on the rotor printed circuit board 13, thereby weakening the strength of the alternating electromagnetic field of the excitation coil 15. The induced electromotive force on the receiving coil 16 is changed due to the uneven electromagnetic field strength. When the rotor printed circuit board 13 rotates one revolution relative to the stator printed circuit board 14, a plurality of signals with same cycle are each obtained on the receiving coil 16. After the received signals are input to the processing chip 17, an encoded signal with high precision and high resolution is output through calculation, and transmitted to the motor control system, thereby accurately controlling the start and stop of the motor, the speed control, the power density monitoring, etc.

Compared with the structure of the conventional outer rotor direct drive motor, the structure of Embodiment 1 of the outer rotor direct drive motor of the present invention has an additional rotor printed circuit board 13. In view of the increase in cost and installation complexity, the present invention provides another structure of the outer rotor direct drive motor.

Figure 10:
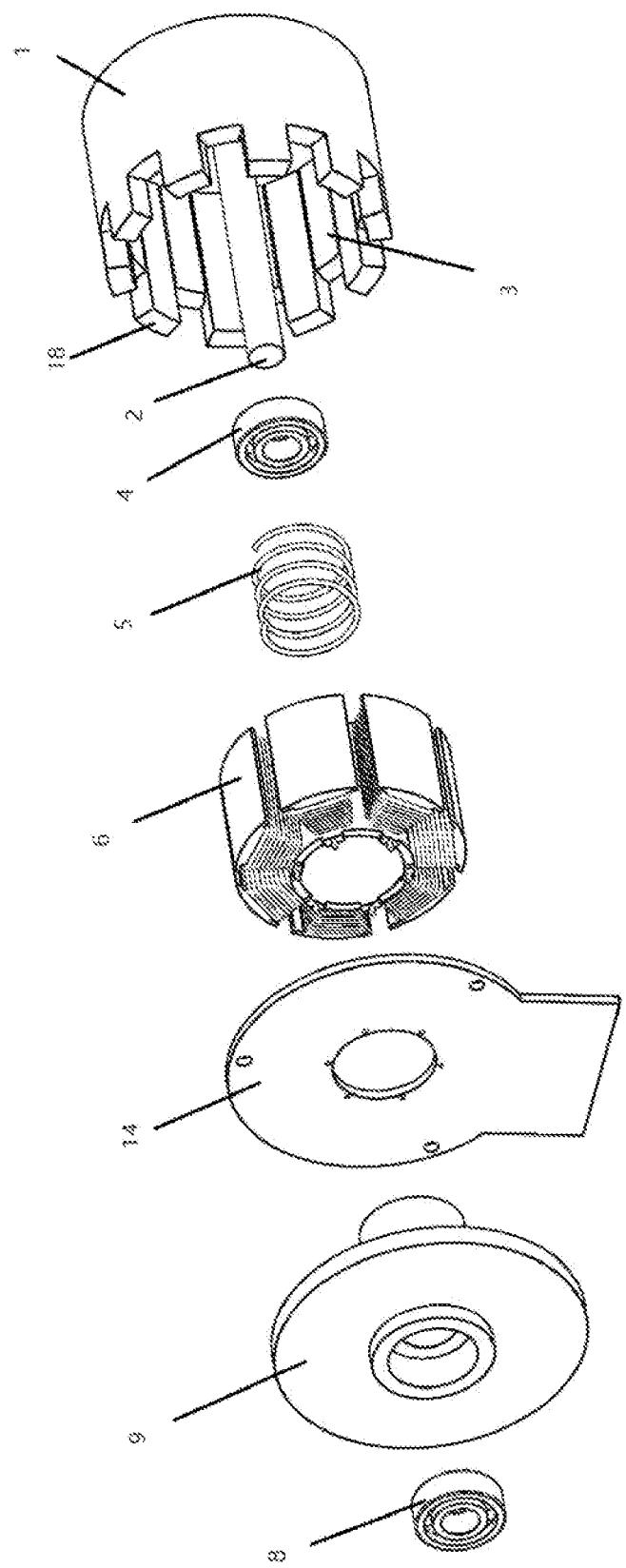
FIG. 10 is a schematic view of an exploded structure of Embodiment 2 of the present invention.

FIG. 10 is a schematic view of an exploded structure of Embodiment 2 of the outer rotor direct drive motor of the present invention.

As shown in FIG. 10, Embodiment 2 of the outer rotor direct-drive motor of the present invention is composed of an outer rotor and a stator. The outer rotor is installed outside the stator. The outer rotor includes the motor housing 1, the motor shaft 2, the permanent magnetic steels 3 and the rotor bearing 4, wherein the motor housing 1 forms a storage space and wraps the stator winding 6 therein. An end of the motor shaft 2 is directly connected to the motor housing 1. At the same time, the permanent magnetic steels 3 are installed on a side surface of an inner wall of the motor housing 1 (or embedded in an inner wall of the motor housing). The rotor bearing 4 is installed on the motor shaft 2 to reduce the friction of the shaft 2 during rotation. The stator includes the stator winding 6, the stator printed circuit board 14, the stator bearing 8 and the stator chassis 9, wherein the stator winding 6 is installed on the stator printed circuit board 14 (including at least the excitation coil 15 and the receiving coil 16). The stator printed circuit board 14 is installed on the stator chassis 9, the stator bearing 8 is installed on the stator chassis 9 to reduce the friction of the shaft 2 during rotation either. The spring 5 is installed between the outer rotor and the stator, and when the two are squeezed by an external force, the spring 5 will play a function of buffering and restoring deformation.

Figure 11:
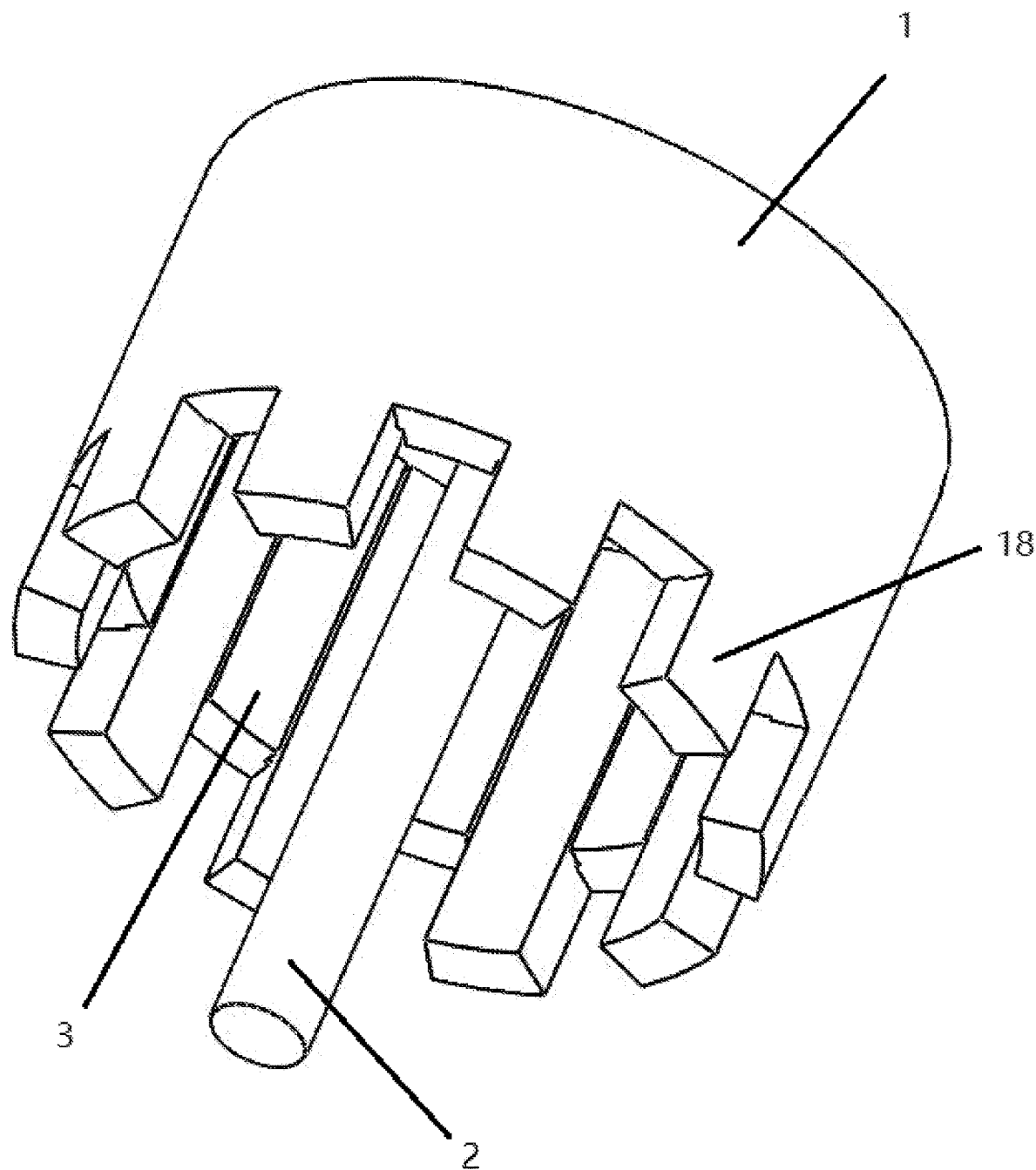
FIG. 11 is a schematic view of an outer motor of Embodiment 2 of the present invention.

FIG. 11 is a schematic view of the outer motor of Embodiment 2 of an outer rotor direct drive motor of the present invention.

As shown in FIG. 11, the outer rotor is composed of the motor housing 1, the motor shaft 2, the permanent magnet steels 3 and the rotor bearing 4. The permanent magnet steels 3 are evenly distributed along the side surface of the inner wall of the motor housing 1 (or embedded in the inner wall of the motor housing), and the polarities are alternately distributed. The number of pole pairs of the permanent magnet steels 3 is an integer greater than or equal to 1 (in the embodiment, the number of pole pairs is 10). An end of the motor shaft 2 is directly connected to the motor housing 1. The rotor bearing 4 is installed on the motor shaft 2 to reduce the friction of the shaft 2 during rotation. The bottom of the side wall of the motor housing 1 has periodically repeated sawtooth structures 18, and the bottom of the side wall of the motor housing 1 is overlapped with the excitation coil 15 and the receiving coil 16 on the stator printed circuit board 14 in a vertical direction.

Based on the above structure of Embodiment 2 of the outer rotor direct drive motor of the present invention, its working method is as follows.

After the system is powered, the processing chip 17 cooperates with the excitation coil 15 to generate a high-frequency periodic AC voltage and current, and the alternating current flowing through the excitation coil will form an alternating electromagnetic field in its peripheral area.

According to Faraday's law of electromagnetic induction, the magnetic flux passing through a closed coil is changed, and an induced electromotive force will be generated on the closed coil. When the alternating electromagnetic field generated on the excitation coil passes through a closed receiving coil assembly, since the magnetic flux passing through the closed receiving coil assembly alternates, an alternating induced electromotive force with the same frequency is generated on each fan loop coil.

The periodically repeated sawtooth structures at the bottom of the side wall of the motor housing 1 are used to affect the coupling relationship between the excitation coil 15 and the receiving coil 16. When the outer rotor is rotated, the motor housing 1 is driven to rotate together. The alternating electromagnetic field of the excitation coil 15 causes an eddy current field to be generated in the sawtooth structures 18 at the bottom of the side wall of the motor housing 1, thereby weakening the strength of the alternating electromagnetic field of the excitation coil 15. The induced electromotive force on the receiving coil 16 is changed due to the uneven electromagnetic field strength. When the motor housing 1 rotates one revolution relative to the stator printed circuit board 14, a plurality of signals with same cycle are each obtained on the receiving coil 16. After the received signals are input to the processing chip 17, an encoded signal with high precision and high resolution is output through calculation, and transmitted to the motor control system, thereby accurately controlling the start and stop of the motor, the speed control, the power density monitoring, etc.

The present invention differs from the conventional outer rotor direct drive motor in that it uses an electromagnetic induction position encoder. Compared with the Hall switch, the magnetic effect encoder and the photoelectric encoder, the electromagnetic induction position encoder has the following advantages.

a) The installation method is flexible, and it supports through-shaft installation without occupying too much space of the motor body.

b) The sensor structure is stable, the rotor scale area and the induction coil are all printed on the printed circuit board, even in the case where the rotational speed is too fast, deformation or cracking will not be occurred, and at the same time, its non-contact induction method is not affected by external environments such as oil pollution and electromagnetic interference.

c) The accuracy is high and the resolution is high. The receiving coil has one or more periodically repeated specific geometric figure structure characteristics. The more the number of repetition cycles, the more the number of signals obtained, and the higher the resolution of the output signal. It can not only speed up the circuit processing speed, but also improve the accuracy of the encoded signal. Unlike the traditional motors that increase the number of motor pole pairs to improve the resolution, in the embodiment, increasing the number of cycles of the receiving coil only requires drawing more receiving coils on the stator printed circuit board without adding additional cost.

d) The resolution of signal of the motor encoder is increased without adding additional cost or changing the motor structure.

The specific embodiments of the present invention have been described above. It should be understood that the present invention is not limited to the above specific embodiments, and those skilled in the art can make various changes or modifications within the scope of the claims, which does not affect the essence of the present invention. In the case of no conflict, the embodiments of the present application and the features in the embodiments can be arbitrarily combined with each other.

What is claimed is:

1. An outer rotor direct drive motor with a position encoder, comprising: an outer rotor and a stator disposed in the outer rotor, wherein
   the stator comprises:
   a stator chassis;
   a stator printed circuit board disposed on a side of the stator chassis, at least an excitation coil and a receiving coil being printed at the stator printed circuit board; and
   a stator winding disposed on the stator printed circuit board; and
   wherein the outer rotor comprises:
   a motor housing;
   a motor shaft, an end of the motor shaft extending into the motor housing and being connected to a bottom of the motor housing;
   a plurality of permanent magnet steels disposed on an inner side wall of the motor housing; and
   an induction mechanism disposed on the motor housing, the induction mechanism corresponding to the excitation coil and the receiving coil; wherein the induction mechanism comprises a plurality of sawtooth structures periodically repeated and disposed at a bottom of a side wall of the motor housing.

2. The outer rotor direct drive motor with the position encoder according to claim 1, wherein the induction mechanism comprises a rotor printed circuit board disposed on the motor housing, and a plurality of conductive material scale areas periodically repeated in a circumferential direction are printed on the rotor printed circuit board.

3. The outer rotor direct drive motor with the position encoder according to claim 2, wherein the plurality of the conductive material scale areas printed on the rotor printed circuit board are overlapped with the excitation coil and the receiving coil printed on the stator printed circuit board in a vertical direction.

4. The outer rotor direct drive motor with the position encoder according to claim 1, wherein the plurality of sawtooth structures at the bottom of the side wall of the motor housing are overlapped with the excitation coil and the receiving coil printed on the stator printed circuit board in a vertical direction.

5. The outer rotor direct drive motor with the position encoder according to claim 1, wherein the plurality of permanent magnet steels are polarities alternately and evenly distributed along an inner wall of the motor housing.

6. The outer rotor direct drive motor with the position encoder according to claim 5, wherein a number of pole pairs of the plurality of permanent magnetic steels is a positive integer greater than or equal to 1.

7. The outer rotor direct drive motor with the position encoder according to claim 5, wherein a rotor bearing is provided on the motor shaft, and a stator bearing is provided on the stator chassis.

8. The outer rotor direct drive motor with the position encoder according to claim 1, wherein a spring is provided between the outer rotor and the stator.

* * * * *